United States Patent
Toivanen et al.

(10) Patent No.: US 9,633,241 B2
(45) Date of Patent: Apr. 25, 2017

(54) METHOD AND APPARATUS FOR BATTERY OPERATED RADIO TAGS

(71) Applicant: Nokia Technologies Oy, Espoo (FI)

(72) Inventors: Timo J. Toivanen, Mäntsälä (FI); Jarmo Saari, Turku (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/762,164

(22) PCT Filed: Feb. 15, 2013

(86) PCT No.: PCT/FI2013/050182
§ 371 (c)(1),
(2) Date: Jul. 20, 2015

(87) PCT Pub. No.: WO2014/125160
PCT Pub. Date: Aug. 21, 2014

(65) Prior Publication Data
US 2015/0356330 A1  Dec. 10, 2015

(51) Int. Cl.
*G06K 7/10* (2006.01)
*H04W 4/00* (2009.01)
(Continued)

(52) U.S. Cl.
CPC ..... *G06K 7/10207* (2013.01); *G06K 7/10376* (2013.01); *H04W 4/008* (2013.01); *H04W 4/021* (2013.01); *H04W 4/023* (2013.01); *H04W 52/0209* (2013.01); *G01S 13/74* (2013.01); *G06K 7/10386* (2013.01); *G06K 7/10396* (2013.01); *H04L 67/303* (2013.01);
(Continued)

(58) Field of Classification Search
None
See application file for complete search history.

(56) References Cited

U.S. PATENT DOCUMENTS 6,812,824 B1  11/2004  Goldinger et al.
7,148,801 B2 *  12/2006  Crabtree ............. G01S 3/54
340/539.13
(Continued)

FOREIGN PATENT DOCUMENTS

WO    WO-02/073562 A1    9/2002
WO    WO-2009/101471 A2  8/2009
WO    WO-2009101471 A2 * 8/2009 ............ H01Q 1/38

OTHER PUBLICATIONS

International Search Report received for corresponding Patent Cooperation Treaty Application No. PCT/FI2013/050182, dated Oct. 28, 2013, 20 pages.

*Primary Examiner* — Leon-Viet Nguyen
(74) *Attorney, Agent, or Firm* — Harrington & Smith (57) ABSTRACT

An apparatus, method and computer program are disclosed in which a radio unit (110) of a mobile station (100) is caused to periodically communicate with a radio tag (200) with a first period between subsequent communications and to perform pairing with the radio tag (200). Storing of pairing information relating to the paired radio tag (200) is caused. A first profile associated with the mobile station (100) is maintained. A second profile associated with the paired radio tag (200) is maintained. Adapting of the first period is performed based on at least one of: the first profile and the second profile.

20 Claims, 3 Drawing Sheets (51) Int. Cl.
*H04W 4/02* (2009.01)
*H04W 52/02* (2009.01)
*H04W 84/12* (2009.01)
*H04L 29/08* (2006.01)
*G01S 13/74* (2006.01)
*H04W 76/02* (2009.01)
*H04W 76/04* (2009.01)

(52) U.S. Cl.
CPC ........ *H04W 76/023* (2013.01); *H04W 76/048* (2013.01); *H04W 84/12* (2013.01)

(56) References Cited

U.S. PATENT DOCUMENTS

| | | | |
|---|---|---|---|
| 2010/0164715 A1 | 7/2010 | Buller et al. | 340/539.32 |
| 2010/0231381 A1 | 9/2010 | Twitchell, Jr. | |
| 2011/0148625 A1 | 6/2011 | Velusamy | |
| 2012/0110127 A1* | 5/2012 | Morris | H04N 21/4126 709/219 |
| 2012/0139690 A1 | 6/2012 | Gupta et al. | |
| 2013/0154809 A1* | 6/2013 | Subramanian | G01S 13/878 340/10.42 |
| 2015/0102913 A1* | 4/2015 | Vargo | G06K 7/0008 340/10.4 |

\* cited by examiner

METHOD AND APPARATUS FOR BATTERY OPERATED RADIO TAGS

RELATED APPLICATION

This application was originally filed as PCT Application No. PCT/FI2013/050182 filed Feb. 15, 2013.

TECHNICAL FIELD

The present application generally relates to battery operated radio tags. The present application relates in particular, though not exclusively, to temporal adaptation of battery operated radio tags.

BACKGROUND

Battery operated radio tags are often used to tag objects for use over a distance longer than that radio powered tags can provide. Battery operated tags are also often used to reduce power consumption of their reader device as then the reader device need not transmit such a high radio power that the electronics within surrounding passive tags could be so powered.

New Bluetooth® version 4 specifies a standardized version of Smart Devices that consume relatively little power by practically switching off until some event triggers them on. Some examples are a heart rate monitor that sends data only when a given heart rate is exceeded and a wireless thermometer that can be paired and maintained operable for a number of days but sends a reading immediately when used to take a child's temperature.

Bluetooth v4.0 specification has a low energy Find Me profile for smartphone applications that allows users to pair small, often misplaced, objects with their smartphones for locating them when needed. For instance, a Bluetooth low energy proximity key fob is usable to find a misplaced phone using a button on the fob to make the paired smartphone to issue an audible signal. Correspondingly, a misplaced key fob can be found by using the paired smartphone to make the key fob sound an alert. To this end, the key fob should periodically listen to polling signals to detect radio signals sent from the smartphone. However, periodical awakening of the Bluetooth functionality necessarily consumes power and the key fob with Find Me profile operability is useless if it has run out of battery.

SUMMARY

Various aspects of examples of the invention are set out in the claims.

According to a first example aspect of the present invention, there is provided an apparatus comprising:
 a radio unit interface configured to communicate through a radio unit of a mobile station;
 a memory;
 a processor configured to:
 control the radio unit interface to cause the radio unit to periodically communicate with a radio tag with a first period between subsequent communications;
 control the radio unit to perform pairing with the radio tag;
 cause storing in the memory pairing information relating to the paired radio tag;
 maintain a first profile associated with the mobile station;
 maintain a second profile associated with the paired radio tag; and
 adapt the first periods based on at least one of: the first profile and the second profile.

According to a second example aspect of the present invention, there is provided a method comprising:
 causing a radio unit of a mobile station to periodically communicate with a radio tag with a first period between subsequent communications;
 causing the radio unit to perform pairing with the radio tag;
 causing storing of pairing information relating to the paired radio tag;
 maintaining a first profile associated with the mobile station;
 maintaining a second profile associated with the paired radio tag; and
 adapting the first periods based on at least one of: the first profile and the second profile.

According to a third example aspect of the present invention, there is provided an apparatus, comprising a processor configured to:
 cause a radio unit of a mobile station to periodically communicate with a radio tag with a first period between subsequent communications;
 cause the radio unit to perform pairing with the radio tag;
 cause storing of pairing information relating to the paired radio tag;
 maintain a first profile associated with the mobile station;
 maintain a second profile associated with the paired radio tag; and
 adapt the first periods based on at least one of: the first profile and the second profile.

According to a fourth example aspect of the present invention, there is provided an apparatus, comprising:
 at least one processor; and
 at least one memory including computer program code;
 the at least one memory and the computer program code configured to, with the at least one processor, cause the apparatus to perform at least the following:
 causing a radio unit of a mobile station to periodically communicate with a radio tag with a first period between subsequent communications;
 causing the radio unit to perform pairing with the radio tag;
 causing storing of pairing information relating to the paired radio tag;
 maintaining a first profile associated with the mobile station;
 maintaining a second profile associated with the paired radio tag; and
 adapting the first periods based on at least one of: the first profile and the second profile.

According to a fifth example aspect of the present invention, there is provided a computer program comprising:
 code for causing a radio unit of a mobile station to periodically communicate with a radio tag with a first period between subsequent communications;
 code for causing the radio unit to perform pairing with the radio tag;
 code for causing storing of pairing information relating to the paired radio tag;
 code for maintaining a first profile associated with the mobile station;
 code for maintaining a second profile associated with the paired radio tag; and
 code for adapting the first periods based on at least one of: the first profile and the second profile;
 when the computer program is run on a processor.

According to a sixth example aspect of the present invention, there is provided the computer program according to the fifth example aspect, wherein the computer program is a computer program product comprising a computer-readable medium bearing computer program code embodied therein for use with a computer.

According to a seventh example aspect of the present invention, there is provided an computer-readable medium encoded with instructions that, when executed by a computer, perform:

causing a radio unit of a mobile station to periodically communicate with a radio tag with a first period between subsequent communications;

causing the radio unit to perform pairing with the radio tag;

causing storing of pairing information relating to the paired radio tag;

maintaining a first profile associated with the mobile station;

maintaining a second profile associated with the paired radio tag; and adapting the first periods based on at least one of: the first profile and the second profile.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4 of the drawings. In this document, like reference signs denote like parts or steps.

Figure 1:
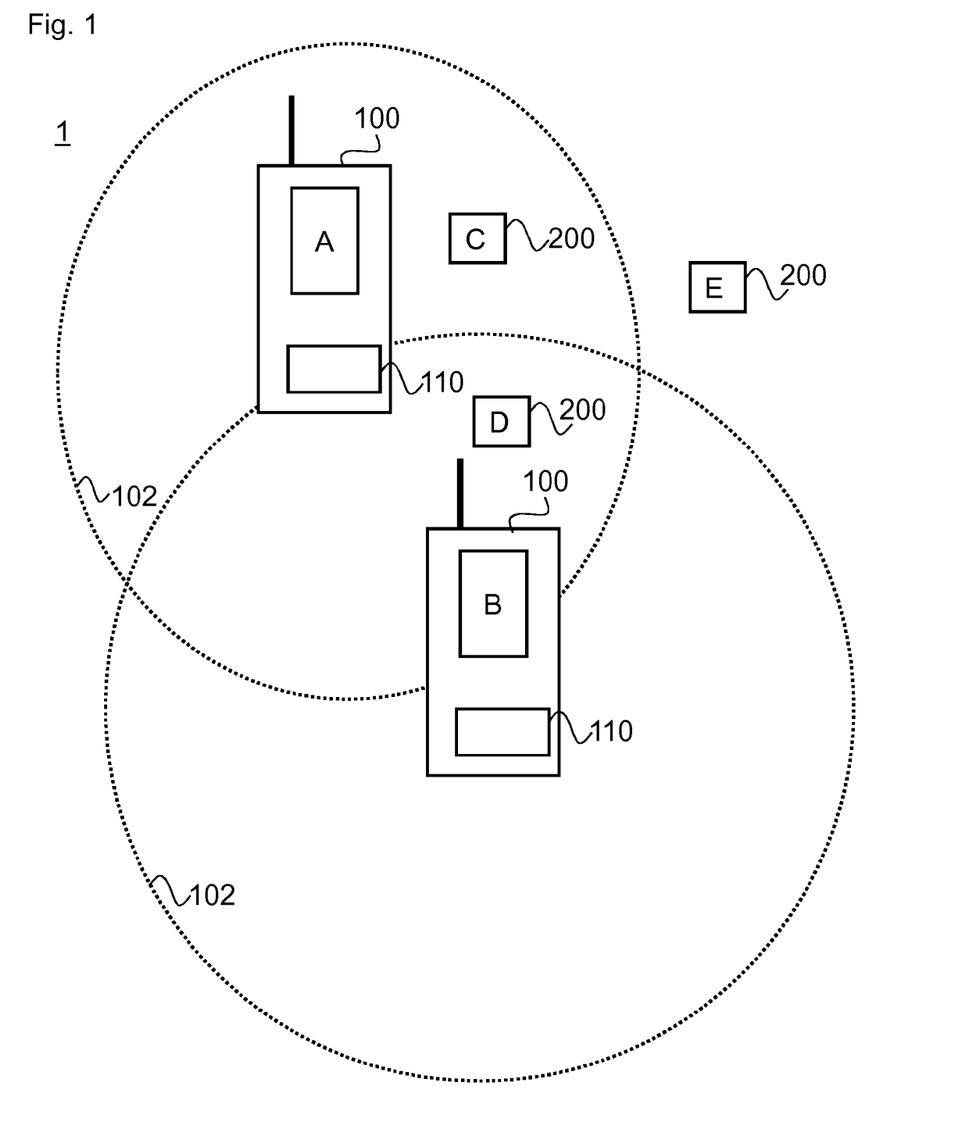
FIG. 1 shows an architectural overview of a system of an example embodiment of the invention.

FIG. 1 shows an architectural overview of a system 1 of an example embodiment of the invention. The system 1 comprises two mobile stations 100 each comprising a control unit or apparatus 110, and a plurality of radio tags 200. The mobile stations 100 can have same or different configuration. The radio tags 200 can have same or different configuration. In sake of simplicity of this description, the two mobile stations are drawn with letters A and B on their displays, respectively, for referring by this letter alone. Likewise, the radio tags 200 are denoted with letter C to E for ease of referring. The mobile stations 100 are any host devices that can communicate with radio tags, such as: mobile telephones; portable computers; personal digital assistants; handheld game consoles; navigation devices; and/or electronic books.

FIG. 1 also shows an illustrational coverage area 102 drawn as a dotted line around each of the radio units 110. In sake of illustration, these coverage areas are of different size and shape. While drawn symmetric, real life implementations can have any shape and range.

System 1 is drawn so that radio tags C and D are within coverage of mobile station A, radio tag D is within coverage of mobile station B and radio tag E is out of coverage of any mobile station. In sake of simplification, we assume that the radio tag C is attached to a wallet of a user of the mobile station A and radio tag D is attached to or formed as a key fob that is attached to keys of the user of mobile station A. The radio tags C and D are paired with the mobile station A. The radio tag E is paired with the mobile station B. In this document, term pairing can be understood, for example, as a process in which involved parties establish a relationship by creating a shared secret known as a link key. When the involved parties store the link key, they can subsequently detect presence of each other. The shared secret is not necessary in all the embodiments, while its use may mitigate some security risks such as someone forming a fake radio tag to imitate one of the user of the mobile station 100. One example of pairing usable in some example embodiments is that known from the Bluetooth. In an example embodiment, the paring comprises device discovery, identification, authentication and establishing a communication link between paired devices.

In an example embodiment, it is assumed that each of the radio tags 200 in FIG. 1 is paired with only one mobile station 100. As drawn in FIG. 1, the mobile station comprises a control unit or apparatus 110.

Figure 2:
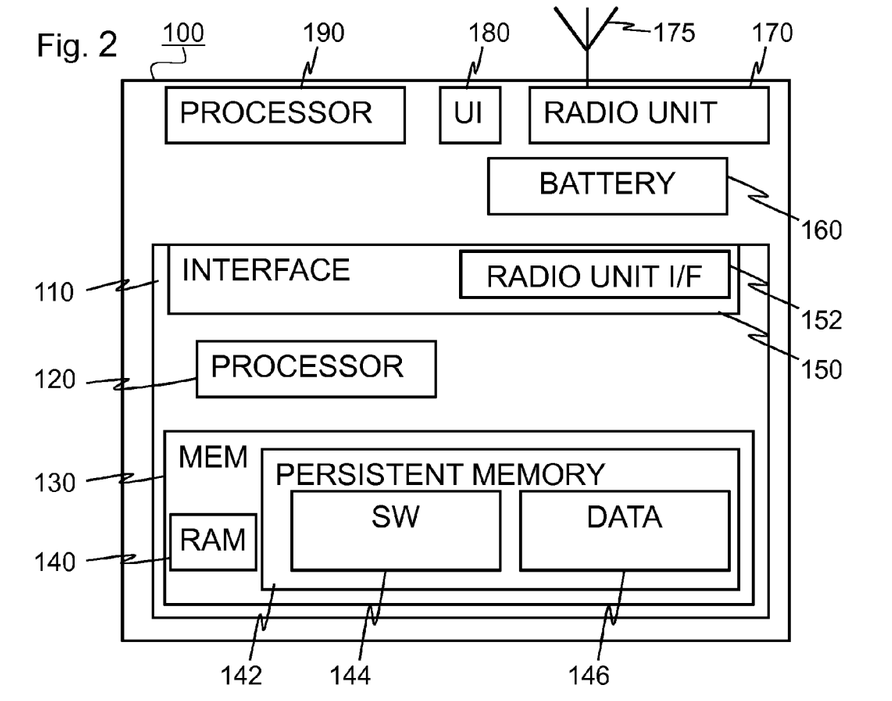
FIG. 2 shows a block diagram of a mobile station, illustrating some elements useful for understanding some example embodiments of the invention.

FIG. 2 shows a block diagram of the mobile station 100, illustrating some elements useful for understanding some example embodiments of the invention. The apparatus 110 has a first processor 120, a memory 130 comprising a work memory 140 and a persistent memory 142 configured to store software 144 and data 146 The apparatus 110 further has an interface block 150 with a radio unit interface 152.

The mobile station further has a battery 160, a radio unit 170 with an antenna 175, a user interface 180 and a second processor 190.

The first processor 120 is, for instance, a central processing unit (CPU); a microprocessor; a digital signal processor (DSP); a graphics processing unit; an application specific integrated circuit (ASIC); a field programmable gate array; a microcontroller or a combination of such elements. The work memory is, for example a random access memory; a flash random access memory; a memory card and/or a memory stick with which the first processor can operate. The persistent memory 142 is, for example, a read only memory;

hard disk; non-volatile memory; optical memory or a combination thereof. The software 144 comprises, for example, an operating system; operating system library modules; application software; device drivers; scripts or any combination thereof. The data 146 comprises, for example, one or more of user profiles; mobile station profiles; and radio tag profiles.

The interface 150 is, for example, a circuitry configured to allow the apparatus 110 communicate with other parts of the mobile station 100 outside the apparatus 110. The interface can be a proprietary interface or an industrially standardized interface configured to allow exchange of electric analog and or digital signals. The interface 150 comprises a radio unit interface, possibly as a separate part or as a logical function within the interface 150, that is configured to pass exchange radio unit information between the first processor and the radio unit 170. The radio unit information can be exchanged directly between the radio unit interface 152 and the radio unit 170 or via other parts such as the second processor 190.

The battery 160 can be a separable or integrated battery. The battery 160 can be a rechargeable unit such as a lithium-ion, Nickel-Cadmium, Lithium-Polymer or Nickel Metal hydride battery.

The radio unit 170 is, for example, a proprietary radio block, a Bluetooth 4 Smart Device enabled radio block, a wireless local area network (WLAN) tag such as a Wi-Fi ID tag, or an ultra-wide band low range radio block. The radio unit 170 is configured to discover proximate radio tags 200 and to communicate with proximate radio tags. Moreover, the radio unit 170 is configured to identify the proximate radio tags and to address communications to desired one or more radio tags 200.

The user interface 180 can be e.g. a touch screen based user interface commonly known from modern mobile telephones. The user interface 180 can comprise one or more of displays; touch detection elements; dedicated keys; soft keys; buzzers; speakers; microphones; vibration units; and any combination thereof.

The second processor 190 can have similar or different structure with the first processor 120. The second processor 190 can be implemented using any one or more of the parts listed in the foregoing as possible parts of the first processor. In one example embodiment, the first and second processors 120, 190 are formed using one or more common parts. The two different processors are drawn to simplify description in this document. It can be assumed that the first processor 120 is configured to control operation of the apparatus 110 based on the software 144 while the second processor 190 is configured to control the operation of the mobile station 100 by large.

Figure 3:
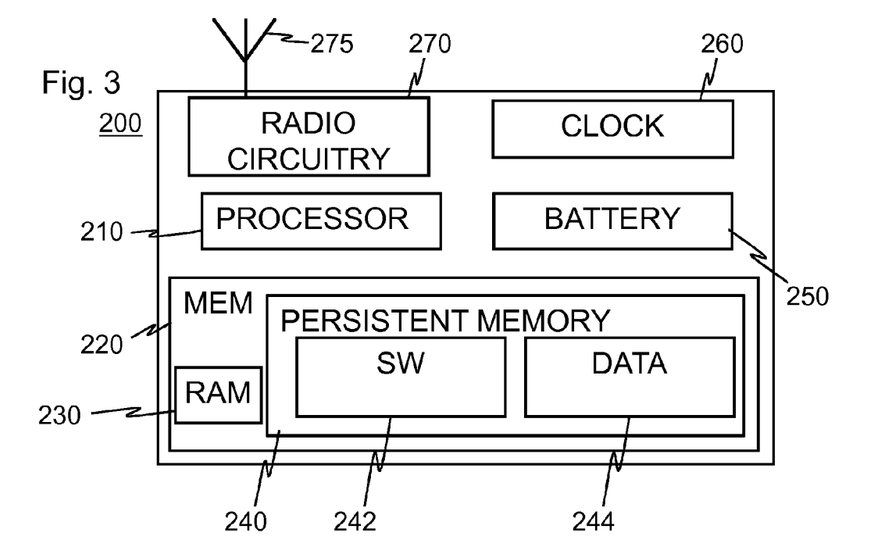
FIG. 3 shows a block diagram of a radio tag, illustrating some elements useful for understanding some example embodiments of the invention.

FIG. 3 shows a block diagram of a radio tag 200, illustrating some elements useful for understanding some example embodiments of the invention. The radio tag 200 has a third processor 210, a memory 220 comprising a work memory 230 and a persistent memory 240 configured to store software 242 and data 244. The radio tag 200 further has a battery 250, a clock 260, and a radio circuitry 270 with an antenna 275.

Various parts of the radio tag 200 can be implemented using corresponding parts as those described for the mobile station 100, while in some example embodiments low-power components are preferred. The battery 250 can be, for instance, a compact battery such as those used in watches such as a coin cell battery or a dry cell battery such as a Manganese dioxide-Lithium battery. The clock 260 is, for example, a local oscillator such as a crystal configured to oscillate at a given frequency and a counter circuitry which together are configured to issue a trigger signal after lapse of a predetermined period set by the third processor 210.

The radio circuitry 270 is, for example, a proprietary radio circuitry, a Bluetooth 4 Smart Device, or an ultra-wide band low range radio device. In an example embodiment, the radio unit 270 is configured to be discoverable by radio signals and to communicate with the mobile station 100.

In the foregoing, the apparatus 110 has been described as a self-contained part that can be a module or circuitry that is distinguishable from the remainder of the mobile station 100. Indeed, the apparatus 110 can be implemented e.g. in a single semiconductor chip, but it is also possible to embed the apparatus 110 into other equipment of the mobile station 100. Hence, in describing the operation of the mobile station, the difference between the apparatus 110 and the mobile station is not particularly relevant. In sake of brevity, much of that discussion will be made referring to the mobile station. For example, the actual radio unit 170 communicating with the radio tag 200 can be outside the apparatus 110 while the apparatus 110 can be configured to control these communications.

Figure 4:
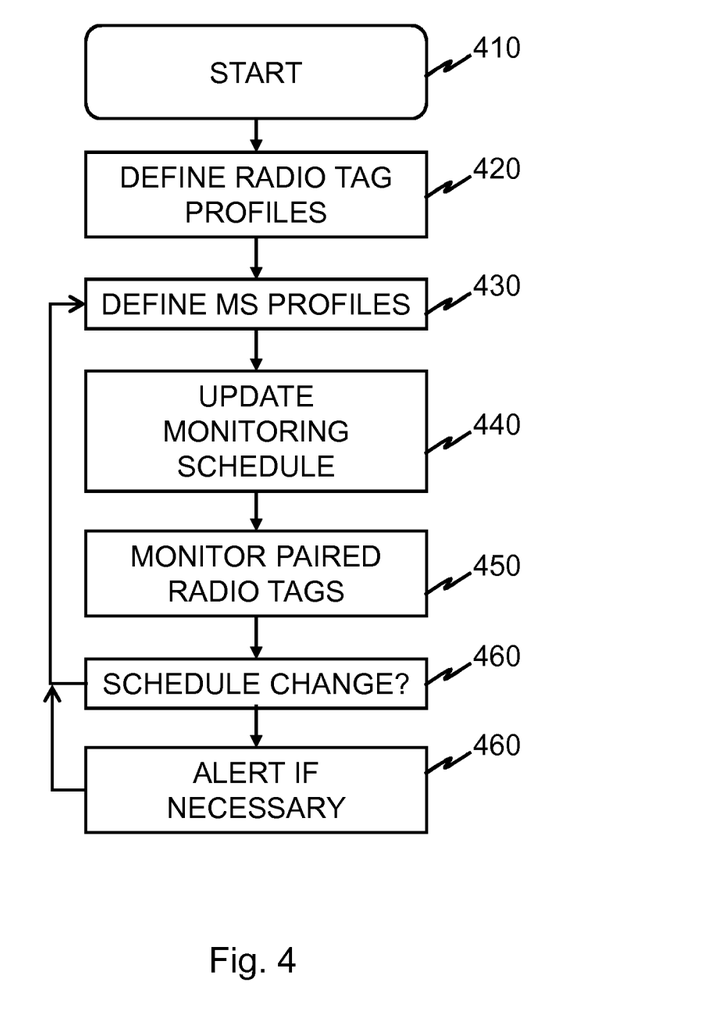
FIG. 4 shows a flow chart illustrating a process according to an example embodiment of the invention.

Various example embodiments are further described with reference to FIG. 4 that shows a flow chart illustrating a process according to an example embodiment of the invention.

In start 410, the mobile station 100, or more particularly according to an example embodiment, the apparatus 110 starts a device discovery, initial pairing with the radio tags 200 and/or storing initial settings. For example, the user can be prompted to set desired thresholds such as distance limits, profile definitions and/or any user preferences. In one example embodiment, these initial settings are obtained from an external source such as internet server. In another example embodiment, the user teaches the distance limits to the apparatus 110 by placing the paired radio tag 200 at a desired distance and then commanding the apparatus to estimate the distance and to store the estimated distance as a distance limit.

In an example embodiment, the mobile station 100 also defines 420 profiles for each of the paired tags. These profiles can be set by the user of the mobile station based on profile names such as wallet, home keys, car keys, remote control and/or other ordinary items that the user might like to tag with the radio tags 200. In one example embodiment, the mobile station 100 is configured to allow the user to name one or more of the radio tag profiles. In an example embodiment, one radio tag profile is applied for more than one paired radio tag.

The apparatus 110 also defines or lets its user define mobile station profiles according to an example embodiment in step 430. These profiles can be also named understandably to the user with names such as home, car, office, public areas, high risk. In an example embodiment, at this or any other stage, also criteria for automatic profile change are set by the user, obtained from a third party such as a service provider or set both by the user and by the third party. The criteria comprise one or more of location; available network devices; accessible radio access points; time of day; day of week; proximity or distance to a given radio tag; movement of the mobile station e.g. as detected by motion sensors; operating mode of the mobile station; currently running software; services being currently used by the mobile station; and user command. The operating mode of the mobile station 100 can be, for example, idle, switched off, internet use, music play, photographing, navigation and/or flight mode.

The apparatus 110 then updates 440 (i.e. forms, if none yet exists) monitoring schedule that defines for each of the paired tags 200 timing or particular time windows during which the apparatus 110 should monitor presence of the paired radio tags 200. The timing can be indicated to paired radio tags 200 as the interval or period between the time windows and as a reference moment based such as the time when the timing is indicated to the paired radio tag 200 or as a time offset from that time.

The updating operates in an example embodiment depending on both of the mobile station profile and the radio tag profile (for each paired radio tag). For instance, when at home (in home profile), the user may prefer long battery life of the radio tags to rapid alarm. In this case, on coming home, the user's apparatus 110 automatically or by user's command enters into home profile and causes the radio unit 170 to set any paired radio tags 200 within its coverage to sleep longer between awakening moments or monitoring windows. In an example embodiment, the monitoring interval is then set e.g. such that with usual walking pace, the mobile station 100 can expect to successfully send at least one radio message the paired radio tags 200 when the user walks by the radio tag. This way, if the user has forgotten where she placed her car keys in the evening, she can simply walk through her apartment so that at some point of time, her mobile station 100 comes into proximity of the paired radio tag during a monitoring window. The mobile station 100 can then command, according to one example embodiment, that e.g. an incorporated signal lamp and/or buzzer at the key fob visually and/or audibly signals the presence of the key fob. The mobile station 100 can also issue an alarm at this point of time. Correspondingly, if the mobile station 100 is missing, the user can take the key fob and walk through her apartment until the key fob comes into range of the mobile station 100. Then, the paired radio tag 200 of the key fob can issue an alert signal and/or cause the mobile station to audibly and/or visually identify itself.

The aforementioned monitoring interval can be adjusted depending on mobile station profile e.g. so that at home the monitoring interval is constantly 1 s to 10 s or e.g. 2 s to 5 s. On the other hand, in less safe locations or with some other mobile station profiles, the monitoring interval can also depend on the distance between the mobile station 100 and the radio tag 200. In an example embodiment, the distance is understood as a zone selected from a number of zones, e.g. 2 to 5 different zones. For instance, a first zone can be set approximately as close enough for the radio tag to be within reach of a hand when the mobile station 100 is worn or held by its user. The second zone is then up to e.g. 1 m to 3 m and the third zone is e.g. by 1 to 3 meters yet farther. A fourth zone can be set as of the border of the third zone to the end of the coverage of the mobile station. The distance can then be expressed with resolution of one zone.

The distance between the mobile station and the paired radio tags is measured in any available technique. For instance, radio propagation delay, signal attenuation, signal quality (such as bit error rate, signal to noise ratio, received signal strength indication, or any combination thereof can be used.

In step 450, the mobile station 100 monitors the paired radio tags by receiving information from the radio unit and comparing that information with earlier received information.

In step 460, the mobile station 100 checks if any alarm or alert criteria are met and if yes, the mobile station 100 issues an alarm signal by itself and/or causes its paired radio tag 200 to issue the alarm signal.

It is clear in view of the foregoing that for adaptation of the monitoring interval or period between subsequent communications, the mobile station can in an example embodiment apply fixed monitoring interval while the mobile station 100 remains in a given mobile station profile and distance adapting monitoring interval in one or more other mobile station profiles. In mobile station profiles with which distance adapting is used, the mobile station 100 resumes to update the monitoring schedule if the distance or distances with paired radio tags 200 changed e.g. from one zone to another.

In an example embodiment, the monitoring interval is inversely proportional to the distance such that a sufficient number of communications can typically be received from the paired radio tags before loss of range if e.g. someone tries to steal an item attached to the paired radio tag and walk or run away. In an example embodiment, the paired radio tags 200 can also be configured to issue an alarm if radio coverage of the mobile station 100 is lost or radio signals from the mobile station 100 diminish with a speed or gradient that exceeds a pre-set threshold time set by the mobile station 100 and sent to the paired radio tag 200.

Without in any way limiting the scope, interpretation, or application of the claims appearing below, a technical effect of one or more of the example embodiments disclosed herein is that the operation of battery operated radio tags can be temporally adapted such that the battery life can be extended with longer communication intervals where possible without unduly compromising connectivity between such radio tags and their host devices. Another technical effect of one or more of the example embodiments disclosed herein is that by adapting the intervals based on distance zones, the temporal adaptation can be performed computationally efficiently and with little communications between the host devices and the radio tags.

Embodiments of the present invention may be implemented in software, hardware, application logic or a combination of software, hardware and application logic. In an example embodiment, the application logic, software or an instruction set is maintained on any memory element of the apparatus; any memory element of the mobile station; or any conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   at least one processor; and
   at least one memory including computer program code, where the at least one memory and the computer program code are configured, with the at least one processor, to cause the apparatus to at least:
   communicate through a radio unit of a mobile station comprising:
      periodically communicate with a radio tag with a first period between subsequent communications;
      performing pairing with the radio tag;
      causing storing in the memory pairing information relating to the paired radio tag;
      defining a first profile associated with the mobile station, wherein the first profile is defined at the mobile station based on at least a location of the mobile station being at least one of a home, car, office, public area, and a high risk location;
      defining a second profile associated with the paired radio tag; and
      adjusting the first period between the subsequent communications based on at least the first profile associated with the mobile station and the second profile associated with the paired radio tag.

2. The apparatus of claim 1, wherein the at least one memory including the computer program code is configured with the at least one processor to cause the apparatus to define the first profile depending on operating mode of the mobile station.

3. The apparatus of claim 1, wherein the at least one memory including the computer program code is configured with the at least one processor to cause the apparatus to define the first profile depending on software being currently run by the mobile station.

4. The apparatus of claim 1, wherein the at least one memory including the computer program code is configured with the at least one processor to cause the apparatus to define the first, profile depending on services being currently used by the mobile station.

5. The apparatus of claim 1, wherein the at least one memory including the computer program code is configured with the at least one processor to cause the apparatus to define the first profile depending on a user command.

6. The apparatus of claim 1, wherein the at least one memory including the computer program code is configured with the at least one processor to cause the apparatus to adjust the first period depending on estimated distance between the apparatus and the paired radio tag.

7. The apparatus of claim 6, wherein the at least one memory including the computer program code is configured with the at least one processor to cause the apparatus to adjust the first period depending on the estimated distance with resolution of one zone of two or more zones.

8. The apparatus of claim 6, wherein the at least one memory including the computer program code is configured with the at least one processor to cause the apparatus to receive radio signal information from the radio unit via the radio unit interface and to estimate the distance based on the received radio signal information.

9. The apparatus of claim 1, wherein the at least one memory including the computer program code is configured with the at least one processor to cause the apparatus to define the second profile depending on quality of radio connection between the apparatus and the paired radio tag.

10. The apparatus of claim 1, wherein the at least one memory including the computer program code is configured with the at least one processor cause the apparatus to define the second profile depending on estimated distance between the apparatus and the paired radio tag.

11. The apparatus of claim 1, wherein the at least one memory including the computer program code is configured with the at least one processor to cause the apparatus to cause, using the radio unit interface, the radio unit to inform the paired radio tag of timing of the periodical communicating.

12. The apparatus of claim 11, wherein the timing of the periodical communicating is indicated by the first period and by a reference moment.

13. The apparatus of claim 1, wherein: the at least one memory including the computer program code is configured with the at least one processor to cause the apparatus to determine if the paired radio tag and the apparatus distance from each other and if yes to further: determine which of the paired radio tag and the apparatus is moving apart from one another and to correspondingly cause issuing of a user perceivable signal.

14. The apparatus of claim 13, wherein the at least one memory including the computer program code is configured with the at least one processor to cause the apparatus to cause issuing the user perceivable signal at one or more of the paired radio tag; the apparatus; and the mobile station.

15. The apparatus of claim 13, wherein the at least one memory including the computer program code is configured with the at least one processor to cause the apparatus to cause depending on the first profile the issuing the user perceivable signal at one or more of the paired radio tag; the apparatus; and the mobile station.

16. A method comprising:
   causing a radio unit of a mobile station to periodically communicate with a radio tag with a first period between subsequent communications;
   causing the radio unit to perform pairing with the radio tag;
   causing storing of pairing information relating to the paired radio tag;
   defining a first profile associated with the mobile station, wherein the first profile is defined at the mobile station based on at least a location of the mobile station being at least one of a home, car, office, public area, and a high risk location;
   defining a second profile associated with the paired radio tag; and
   adjusting the first period based on at least the first profile and the second profile associated with the paired radio tag.

17. The method of claim 16, comprising adjusting the first period depending on operating mode of the mobile station.

18. The method of claim 16, comprising adjusting the first period depending on software being currently run by the mobile station.

19. A non-transitory computer-readable medium encoded with instructions that, when executed by at least one processor, cause operations comprising:
   causing a radio unit of a mobile station to periodically communicate with a radio tag with a first period between subsequent communications;
   causing the radio unit to perform pairing with the radio tag; causing storing of pairing information relating to the paired radio tag;
   defining a first profile associated with the mobile station, wherein the first profile is defined at the mobile station based on at least a location of the mobile station being at least one of a home, car, office, public area, and a high risk location;

defining a second profile associated with the paired radio tag; and adjusting the first period based on at least the first profile and the second profile associated with the paired radio tag.

20. The apparatus of claim 1, wherein the defining the first profile and the second profile is performed automatically based on criteria received from a service provider of the mobile station.

* * * * *